United States Patent Office 2,971,026
Patented Feb. 7, 1961

2,971,026

POLYNITRAZA ACIDS

Clinton R. Vanneman, Claremont, and Karl Klager, Monrovia, Calif., assignors to Aerojet-General Corporation, Azusa, Calif., a corporation of Ohio No Drawing. Filed July 8, 1955, Ser. No. 520,916

15 Claims. (Cl. 260—534)

This invention relates to nitraza acids. In particular, it relates to polynitraza acids having the general formula:

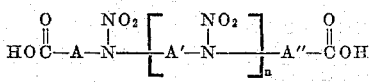

wherein A, A' and A" are the same or different alkylene radicals and $n$ is a small whole number from 1 to 6 inclusive.

This application is a continuation-in-part of our copending application Serial No. 438,296, filed June 21, 1954, now abandoned.

The acids of this invention are useful as intermediates in the preparation of their corresponding diisocyanates, as disclosed in our copending application Serial No. 520,914, filed July 8, 1955. The diisocyanates thus obtained react with polynitro alcohols such as 2,2,2-trintroethanol to form valuable high explosive compositions, as disclosed in assignee's copending application Serial No. 464,610, filed October 25, 1954.

The compounds of this invention are prepared by hydrolyzing the corresponding nitriles, in accordance with the general reaction scheme set forth below:

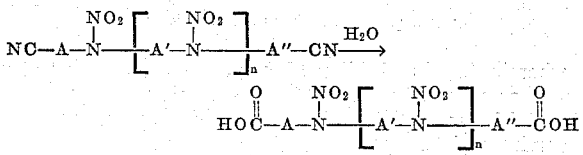

wherein A, A', A" and $n$ are as defined above.

As a matter of convenience, the hydrolysis is usually conducted in the presence of a strong mineral acid.

The starting materials used for this invention are obtained by reacting the corresponding aza-nitriles with nitric acid, as disclosed in our copending application Serial No. 520,915, filed July 8, 1955, now abandoned.

To more clearly illustrate this invention, the following examples are presented. It is to be understood, however, that these examples are presented merely as a means of illustration and are not intended to limit the scope of the invention in any way.

EXAMPLE I

*Preparation of 4,7,10-trinitraza-1,13-tridecanedioic acid*

A mixture of 15.5 gm. (0.045 mole) 4,7,10-trinitraza-1,13-tridecane dinitrile and 186 ml. concentrated hydrochloric acid was heated at 85–90° C. for 8 hours. The mixture was chilled to 0° C. and the dense, crystalline product was collected by filtration. The product was washed successively with water, a minimum amount of methanol for the removal of the water, and absolute ether. After thorough drying in a vacuum desiccator over phosphorous pentoxide, the 4,7,10-trinitraza-1,13-tridecanedioic acid weighed 14.9 gm., corresponding to an 86.6% yield. The material exhibited a double melting point; melting at 176–178° C., resolidifying, and remelting at 186–189° C. A sample was prepared for analysis by recrystallization from water. The elemental analysis of the product is as follows:

Calculated for $C_{10}H_{18}O_{10}N_6$: percent C, 31.42; percent H, 4.75; percent N, 21.99. Found: percent C, 31.05; percent H, 4.65; percent N, 23.24.

EXAMPLE II

*Preparation of 4,7-dinitraza-1,10-decanedioic acid*

A mixture of 153 gm. (0.598 mole) 4,7-dinitraza-1,10-decane dinitrile and 1800 ml. hydrochloric acid was warmed by means of a heating mantle. During a 15 minute period the temperature was raised to 50° C. with complete solution of the dinitrile. Within 5 minutes, rapid precipitation of the crystalline imido hydrochloride began. With continued heating this precipitate was hydrolyzed, and a clear solution resulted after approximately 3 hours. The solution was chilled thoroughly and the crystalline product which precipitated was collected by filtration and washed with ice water. After thorough drying in a vacuum desiccator over phosphorous pentoxide, the acid weighed 157.4 gm., corresponding to 95.8% of the theoretical. A sample of 4,7-dinitraza-1,10-decanedioic acid (M.P. 141.5–142.5° C.) was submitted for analysis after recrystallization from hot water. The elemental analysis of the product is as follows:

Calculated for $C_8H_{14}N_4O_8$: percent C, 32.66; percent H, 4.80; percent N, 19.04. Found: percent C, 32.91; percent H, 4.82; percent N, 19.91.

EXAMPLE III

*Preparation of 4,8-dinitraza-1,11-undecanedioic acid*

A solution of 78 gm. (0.289 mole) 4,8-dinitraza-1,11-undecane dinitrile in 780 ml. 37% hydrochloric acid was heated on the steambath at 90° C. for 6.5 hours. The product separated in large, colorless crystals on storage of the solution overnight at room temperature. The dicarboxylic acid was removed by filtration, washed well with ice water, and dried. The 4,8 - dinitraza - 1,11 - undecanedioic acid weighed 63.5 gm. corresponding to a 71.3% yield. A sample of the product was further purified by three recrystallizations from hot water to give material melting at 147.5–149° C. The elemental analysis of the product is as follows:

Calculated for $C_9H_{16}O_8N_4$: percent C, 35.07; percent H, 5.23; percent N, 18.18. Found: percent C, 34.84; percent H, 5.19; percent N, 18.50.

EXAMPLE IV

*Preparation of 3,6-dinitraza-1,8-octanedioic acid*

A mixture of 102.5 gm. (0.45 mole) 3,6-dinitraza-1,8-octane dinitrile and 510 ml. 37% hydrochloric acid was gradually warmed on the steambath. Agitation was necessary to prevent excess frothing until the nitrile dissolved at about 75° C. Heating was continued for 3 hours at 90–95° C. The mixture was cooled to 20–25° C., and the product was collected by filtration, washed with ice water, and dried in a vacuum desiccator over potassium hydroxide pellets. The 3,6-dinitraza-1,8-octanedioic acid weighed 75 gm., corresponding to a 62.7% yield. The analytical sample melted at 207–209° C. (dec.) following recrystallization from hot water. The elemental analysis of the product is as follows:

Calculated for $C_6H_{10}O_8N_4$: percent C, 27.07; percent H, 3.79; percent N, 21.05. Found: percent C, 26.89; percent H, 3.00; percent N, 20.10.

EXAMPLE V

*Preparation of 4,11-dinitraza-1,14-tetradecanedioic acid*

A mixture of 268 gm. (0.86 mole) 4,11-dinitraza-1,14-tetradecane dinitrile and 2150 ml. 37% hydrochloric acid was warmed on the steambath until solution occurred and then heated at 90–95° C. for 4.5 hours. The solution was allowed to cool to room temperature with the crystallization of the product. The latter was collected by filtration, washed with ice water, and thoroughly dried. The 4,11-dinitraza - 1,14 - tetradecanedioic acid weighed 242.5 gm. corresponding to an 80.7% yield and melted at 138.5–140° C. The melting point was not altered by repeated recrystallizations from hot water. The elemental analysis of the product is as follows:

Calculated for $C_{12}H_{22}O_8N_4$: percent C, 41.14; percent H, 6.33; percent N, 15.99. Found: percent C, 40.97; percent H, 6.13; percent N, 15.74.

EXAMPLE VI

*Preparation of 4,7,10,13-tetranitraza-1,16-hexadecanedioic acid*

4,7,10,13-tetranitraza-1,16-hexadecane dinitrile was hydrolyzed using 15 ml. 37% hydrochloric acid per gram of dinitrile. On warming the mixture on the steambath, the 4,7,10,13-tetranitraza - 1,16 - hexadecane dinitrile dissolved at about 85° C. followed by the crystallization of an intermediate. On continued heating, further reaction again produced a clear solution during a 45 minute period with the subsequent crystallization of the 4,7,10,-13-tetranitraza-1,16-hexadecanedioic acid. Heating was continued for 2 hours, the mixture was chilled to room temperature and filtered, and the product was washed with water and methanol. Recrystallization of the acid from an aqueous acetone solution gave material melting at 203.5–205.5° C. The elemental analysis of the product is as follows:

Calculated for $C_{12}H_{22}O_{12}N_8$: percent C, 30.64; percent H, 4.72; percent N, 23.82. Found: percent C, 30.55; percent H, 4.85; percent N, 23.55.

We have also found that polynitraza-dinitriles, such as 3,5 - dinitraza - 1,7 - heptane dinitrile, 3,5 - dinitraza-1,8-octane dinitrile, and 4,6-dinitraza-1,9-nonane dinitrile readily undergo hydrolysis to produce 3,5-dinitraza-1,7-heptanedioic acid, 3,5-dinitraza-1,8-octanedioic acid, and 4,6-dinitriza-1,9-nonanedioic acid.

Higher molecular weight dibasic acids having at least as many as six nitraza-alkylene units can be prepared simply by reacting the corresponding dinitriles in the manner set forth in the examples.

The particular temperatures employed in the hydrolysis reaction are not critical in the practice of this invention. Lower temperatures will require longer reaction times, and conversely, higher temperatures allow the reaction to go to completion more rapidly.

The hydrolysis reaction can be effected in any conventional manner including hydrolysis with a strong mineral acid as well as by alkaline hydrolysis with a base such as sodium hydroxide. In the latter procedure, it is of course necessary to neutralize the resultant acid salt to obtain the desired free acid.

Any member of the disclosed new class of nitraza acids can be prepared by merely hydrolyzing an appropriate polynitrazadinitrile, in accordance with the teachings of this invention.

We claim:
1. Polynitraza acids having the general formula:

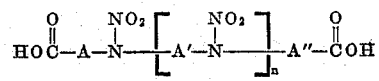

wherein A, A′ and A″ are lower alkylene radicals and $n$ is a small whole number from 1 to about 6.

2. 4,7-dinitraza-1,10-decanedioic acid having the structural formula:

3. 4,7,10-trinitraza-1,13-tridecanedioic acid having the structural formula:

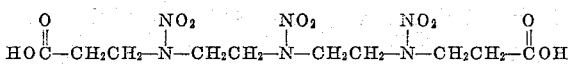

4. 4,8-dinitraza - 1,11 - undecanedioic acid having the structural formula:

5. 3,6-dinitraza-1,8-octanedioic acid having the structural formula:

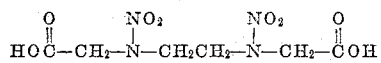

6. 4,11-dinitraza-1,14-tetradecanedioic acid having the structural formula:

7. 4,7,10,13 - tetranitraza - 1,16 - hexadecanedioic acid having the structural formula:

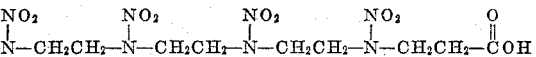

8. The method of preparing polynitraza acids having the general formula:

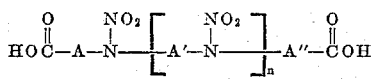

which comprises hydrolyzing a polynitraza compound having the general formula:

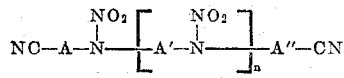

wherein A, A′ and A″ are lower alkylene radicals and $n$ is a small whole number from 1 to about 6.

9. The method of claim 8 wherein the hydrolysis is conducted in the presence of a strong mineral acid.

10. The method of preparing 4,7-dinitraza-1,10-decanedioic acid which comprises hydrolyzing 4,7-dinitraza-1,10-decane dinitrile.

11. The method of preparing 4,7,10-trinitraza-1,13-tridecanedioic acid which comprises hydrolyzing 4,7,10-trinitraza-1,13-tridecane dinitrile.

12. The method of preparing 4,8-dinitraza-1,11-undecanedioic acid which comprises hydrolyzing 4,8-dinitraza-1,11-undecane dinitrile.

13. The method of preparing 3,6-dinitraza-1,8-octanedioic acid which comprises hydrolyzing 3,6-dinitraza-1,8-octane dinitrile.

14. The method of preparing 4,11-dinitraza-1,14-tetradecanedioic acid which comprises hydrolyzing 4,11-dinitraza-1,14-tetradecane dinitrile.

15. The method of preparing 4,7,10,13-tetranitraza-1,16-hexadecanedioic acid which comprises hydrolyzing 4,7,10,13-tetranitraza-1,16-hexadecane dinitrile.

References Cited in the file of this patent

Barrott et al.: J. Chem. Soc. (1951), pages 1282–89.
Holstead et al.: J. Chem. Soc. (1952), pages 1886–1894.